United States Patent [19]

Maxemchuk

[11] Patent Number: 4,516,239
[45] Date of Patent: May 7, 1985

[54] SYSTEM, APPARATUS AND METHOD FOR CONTROLLING A MULTIPLE ACCESS DATA COMMUNICATIONS SYSTEM INCLUDING VARIABLE LENGTH DATA PACKETS AND FIXED LENGTH COLLISION-FREE VOICE PACKETS

[75] Inventor: Nicholas F. Maxemchuk, Mountainside, N.J.

[73] Assignee: AT&T Bell Laboratories, Murray Hill, N.J.

[21] Appl. No.: 357,850

[22] Filed: Mar. 15, 1982

[51] Int. Cl.³ .......................... H04J 3/02; H04J 6/00
[52] U.S. Cl. ........................................ 370/85; 370/94
[58] Field of Search ........................... 370/85, 94, 60; 340/825.5

[56] References Cited

U.S. PATENT DOCUMENTS

| | | | |
|---|---|---|---|
| 3,851,104 | 11/1974 | Willard et al. | 370/84 |
| 4,063,220 | 12/1977 | Metcalfe et al. | 340/825.5 |
| 4,199,661 | 4/1980 | White et al. | 340/825.5 |
| 4,259,663 | 3/1981 | Gable | 340/825.5 |
| 4,271,507 | 6/1981 | Gable et al. | 370/94 |
| 4,281,380 | 7/1981 | DeMesa et al. | 370/94 |
| 4,292,623 | 9/1981 | Eswaran et al. | 370/85 |
| 4,332,027 | 5/1982 | Malcolm et al. | 455/58 |
| 4,337,465 | 7/1982 | Spracklen et al. | 370/85 |
| 4,347,498 | 8/1982 | Lee et al. | 370/94 |

OTHER PUBLICATIONS

8th Conference on Local Computer Networks, IEEE 1983; "Some Characteristics of Movable Slot TDM"; Maxemchuk; pp. 62-69.
National Telecommunications Conference, Nov. 29–Dec. 3, 1981, Mehmet Yanilmaz et al.: "A Technique for Voice-Data Integration Over Packet Radio Channels", pp. G4.1.1-G4.1.5.
National Telecommunications Conference, Nov. 30–Dec. 4, 1980, Ichiro Iida et al.: "Random Access Packet Switched Local Computer Network with Priority Function", 37.4.1-37.4.5.
Digest of Papers Spring Compcon. 82, Feb. 22-25, 1982, Tobagi et al.: "The EXPRESS-NET, A Local Area Communication Network Integrating Voice and Data", pp. 121-127.
Bell System Technical Journal, vol. 61, No. 7, Sep. 82; Maxemchuk: "A Variation on CSMA/CD Yields Moveable TDM Slots in Integrated Voice/Data Local Network", pp. 1527-1550.

Primary Examiner—Douglas W. Olms
Assistant Examiner—Frank M. Scutch, III
Attorney, Agent, or Firm—Richard J. Roddy

[57] ABSTRACT

A variation on a carrier sense multiple access/collision detection (CSMA/CD) system protocol for local area, packet, random access, broadcast networks is disclosed for effectively servicing both voice and data traffic. When the instant method is used, a mix of periodic voice traffic and aperiodic data traffic can be transmitted on a channel without the voice packets colliding. Also, an upper bound on the delay experienced by the periodic traffic can be established. In the instant method, aperiodic sources contend for a channel as in conventional CSMA/CD networks. However, unlike conventional protocols, periodic sources transmit a preempt field, responsive to which aperiodic sources terminate transmission. Also unlike conventional protocols, a periodic "time slot" may be delayed up to one packet transmission time when the network is busy transmitting aperiodic data. Additional information can be transmitted in an overflow field so that a receiver can supply periodic samples at regular intervals with the advantageous result of obviating discontinuities in a reconstructed analog speech waveform. Also unlike conventional CSMA/CD networks, the system capacity can be fully utilized by periodic sources. Still further, the instant method contemplates a system with no centralized control to assign "time slots" or to reallocate capacity between periodic and aperiodic sources. In addition, movable time slots allow timing discrepancies between periodic sources to be tolerated.

8 Claims, 4 Drawing Figures

APERIODIC PACKET

FIG. 4

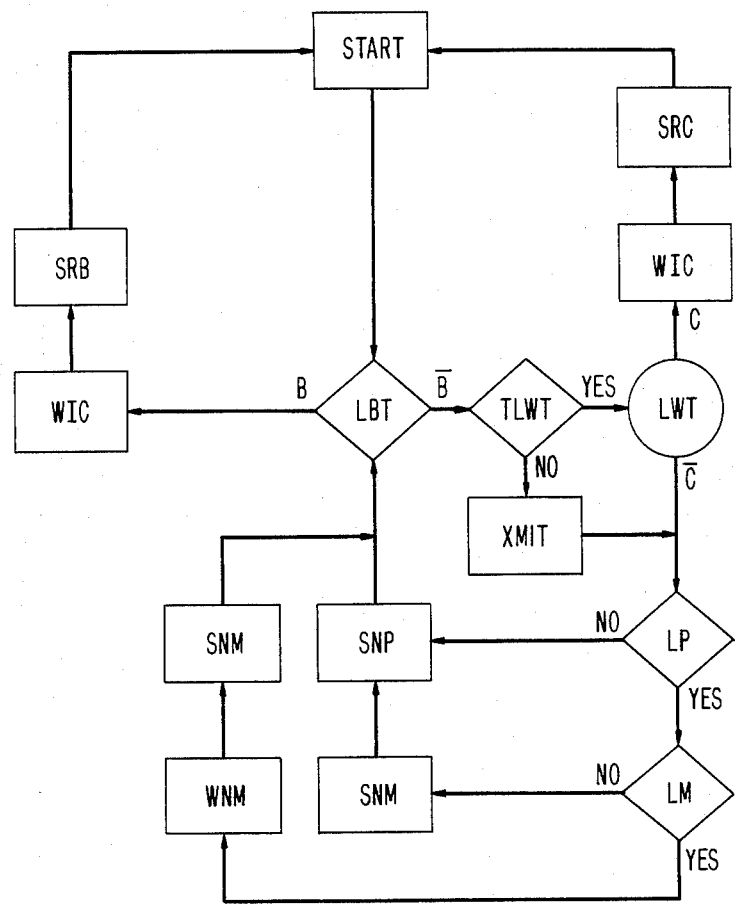

LEGEND:

B - CHANNEL BUSY
C - COLLISION DURING TRANSMISSION
LBT - LISTEN TO THE CHANNEL BEFORE TRANSMITTING
LM - TEST IF THE TRANSMITTED MESSAGE WAS THE LAST MESSAGE IN THE QUEUE
LP - TEST IF THE TRANSMITTED PACKET WAS THE LAST PACKET IN THE MESSAGE
LWT - LISTEN TO THE CHANNEL WHILE TRANSMITTING
SNM - SCHEDULE TRANSMISSION OF NEXT MESSAGE
SNP - SCHEDULE TRANSMISSION OF NEXT PACKET
SRB - SCHEDULE A RETRY AFTER A BUSY CHANNEL
SRC - SCHEDULE A RETRY AFTER A COLLISION
TLWT - TEST IF THIS SOURCE IS TO LISTEN WHILE TRANSMITTING
WIC - WAIT FOR IDLE CHANNEL
WNM - WAIT FOR NEXT MESSAGE
XMIT - TRANSMIT

SYSTEM, APPARATUS AND METHOD FOR CONTROLLING A MULTIPLE ACCESS DATA COMMUNICATIONS SYSTEM INCLUDING VARIABLE LENGTH DATA PACKETS AND FIXED LENGTH COLLISION-FREE VOICE PACKETS

TECHNICAL FIELD

This invention relates to communications systems and, more particularly, to a multiple access digital data communications system, apparatus, and method.

BACKGROUND OF THE INVENTION

In the early days of the telephone art, use of the telephone was often confined to communications among users within a local geographic area. As a result and over the years, the economies related to accessing a communications system have lead to telephones in a local area usually being interconnected through a central controller, often called a local central office in the art.

As digital computers came upon the scene, another local community of use was discernible. Hence, a central controller is commonly employed for interconnecting various user terminals, or stations. For example, U.S. Pat. No. 3,851,104; entitled "Digital Communications System" and issued Nov. 26, 1974; discloses a time division, multiple access communications system which, under the control of a central terminal, allows an interconnection among a plurality of user terminals by way of a single communications signal channel.

As the digital computer art advanced, parallel advances in the semiconductor art have lead to smaller, relatively inexpensive computers. With the advent of such smaller computers, the technique of central control is being abandoned in favor of a distributed control technique. Also, because of the usually bursty nature of digital computer information, the recent trend has also been toward communications systems having a capability for handling packets of digital information. One such distributed control communications system is disclosed in U.S. Pat. No. 4,063,220; entitled "Multipoint Data Communication System with Collision Detection" and issued Dec. 13, 1977. Such known systems are commonly called Carrier Sense Multiple Access/Collision Detection (CSMA/CD) Systems. Indeed, the '220 patent discloses a communications system in which, when a terminal or a station or a source is to start an intended packet transmission on a communications channel, a phase decoder listens to signals on the channel before transmitting (LBT). Upon detecting the presence of another transmission on the channel, the terminal delays the intended transmission until no other transmissions are sensed, i.e., it waits for an idle channel (WIC). When the intended transmission is started, the terminal thereafter listens to signals on the channel, i.e., it listens while transmitting (LWT). If an interference (or collision) is detected, the transmission is terminated and a random number generator is used to schedule a retry by selecting an interval of time at the completion of which a retransmission of the packet will take place. Unfortunately inown CSMA/CD systems do not effectively service both voice and data traffic. Usually, undesirable signal transmission delays may be introduced. Also, collisions being a problem, efforts are called for toward providing a communications system which mitigates the deleterious effects of collisions.

SUMMARY OF THE INVENTION

These and other problems are solved with the instant system, apparatus and method for controlling both digital voice traffic and digital data traffic in a communications system by taking into account periodicities typically present in voice traffic. By having a periodic source, such as a voice source, begin transmitting a packet after the periodic source has successfully acquired access to the channel and by having the voice packet include a preempt field, collisions are reduced. This fortuitously results in a decrease in the network delay. Channel contention is further reduced by having the periodic source transmit all of the voice traffic, that has been priorly accumulated, whenever it transmits and, still further, to schedule its next transmission a predetermined time $T_p$ after the termination of its last successful transmission.

BRIEF DESCRIPTION OF THE DRAWING

The invention should become fully apparent when taken in connection with the following detailed description and accompanying drawings in which:

FIG. 4 includes a flow chart useful in describing the principles of the invention, which flow chart illustrates features of the instant invention and which flow chart can readily be embodied in the system illustrated in FIG. 1.

DETAILED DESCRIPTION

Figure 1:
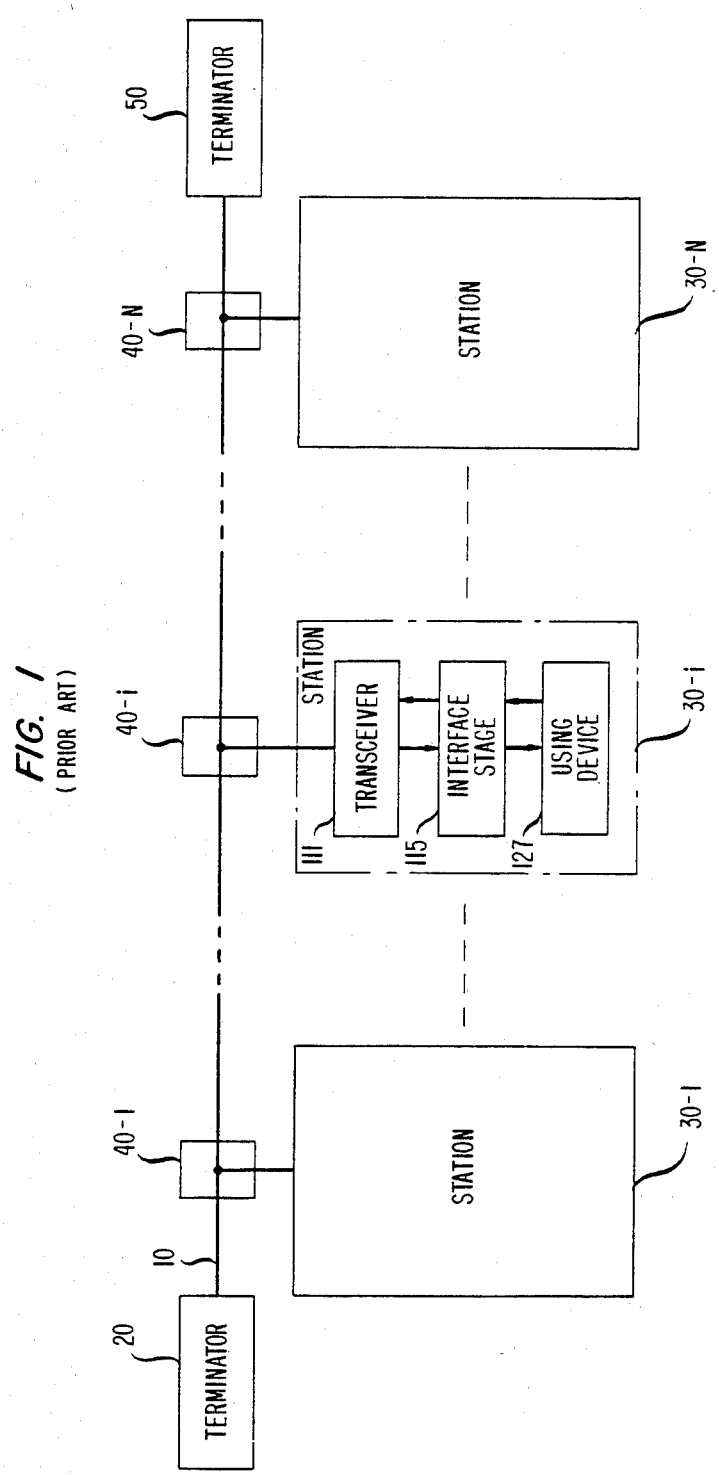
FIG. 1 illustrates a prior art communications system including a plurality of stations, also called terminals or sources in the art, interconnected by a communications channel, which system is useful in describing the principles of the invention.

Broadly, the instant method includes a protocol for transmitting signals of a first kind, here called periodic signals, as well as signals of a second kind, here called aperiodic signals, on a random access broadcast system, such as the system illustrated in FIG. 1. Periodic information can be typified as that commonly encountered with voice or speech signals, e.g., as between telephone users. Such signals, which are usually analog signals, can be straightforwardly processed by an analog-to-digital converter at a station. It is usually important that such periodic signals be transmitted without suffering an unacceptably long delay. A long delay could cause a voice signal to arrive at its intended destination too late to be used. One advantage of the instant method over known protocols is that, with the instant method, the maximum delay before a periodic packet can be transmitted without a collision is the time elapsed during the transmitting of one aperiodic packet, which in turn does not exceed the time to transmit one periodic packet. On the other hand, aperiodic information can be typified as that commonly encountered with digital data signals, e.g., as between digital computers. Accordingly, the instant method can be used for controlling the transmission of data which does not occur periodically as well as the transmission of data which does occur periodically. For ease of description and not by way of limitation, in the instant description, the aperiodic information is herein also referred to as data traffic while the periodic information is also referred to as voice traffic. Further, aperiodic packets are assumed to be of variable length. Also, periodic packets are assumed to be of fixed length. Still further, an aperiodic packet is assumed to be of a length which does not exceed the length of a periodic packet.

Referring to the illustrative system structure shown in FIG. 1, which structure broadly parallels the structure disclosed in the aforecited U.S. Pat. No. 4,063,220, the teachings of which are herein incorporated by reference, bidirectional communications signal channel 10 is extended between terminators 20 and 30 and through each of a plurality of cascaded transmission couplers such as passive coupler 40-i. Bidirectional channel 10 may be embodied, for example, through a conventional high frequency coaxial or fiber optic cable. Each of terminators 20 and 30 may, for example, be a conventional impedance matching device for limiting reflections. Each of couplers 40-1 through 40-N may, for example, be a conventional T-connector which is insertable in path 10 so that signals to and from each respective one of sources, or stations, 30-1 through 30-N may be coupled to the communications link thereby formed. (Parenthetically, the words "station" and "source" and "destination" and "terminal" are used interchangeably herein.) In particular, on the one hand, coupler 40-i is for electrically coupling signals, representing, for example, packets of information, from communications channel 10 to station 30-i. In that manner, station 30-i may read (or receive) packets from communications channel 10. On the other hand, coupler 40-i is also for coupling signals representing, for example, packets of information from station 30-i on communications channel 10. In that manner, station 30-i may write (or transmit) packets on communications channel 10.

Station 30-i may include transceiver 111, interface stage 115, and, as a using device, station equipment 127. In turn, terminal equipment 127 could include equipment such as a common telephone coupled through analog-to-digital and digital-to-analog converters and functioning as a voice source for providing digitized voice samples and for reconstructing an analog speech waveform, respectively. Alternatively, terminal equipment 127 could include a digital computer for providing digital data traffic. Also alternatively equipment 127 could include a digital interface unit, for example, for interconnecting channel 10 with one or more other such channels, some of the other channels perhaps being geographically or electrically distant from the instant channel. Obviously, still other alternatives will occur to the skilled artworker.

As an aside, it is common in the art that, when the stations are electrically relatively close to each other, e.g., within about two miles of each other, such an arrangement is referred to as, among other things, a local communications system or network or as a local digital loop. Thus, in line with the structure illustrated in FIG. 1, a plurality of local networks may be interconnected for forming a still larger communications system.

As a further aside, it is well known that electrical signals, depending upon the electromagnetic transmission characteristics of the transmission medium, typically propagate on a communications channel at a speed in the range of 0.6 to 0.9 of the speed of light, which is estimated here to be about 186,000 miles per second. For ease of discussion, the estimated speed of light is here translated to an electromagnetic propagation speed of approximately one foot per nanosecond. Accordingly, it should be clear that channel 10 may be busy at one station, e.g., at station 30-i, only while a packet is electrically being received at, or transmitted from, the station; otherwise channel 10 is not busy, or is idle, at least as to station 30-i. Thus, channel 10 can be busy as to one station and not busy (or idle) as to another station.

Before more particularly describing the invention, some lexicon is further clarified.

Signals in a communications system may be categorized according to many, sometimes varied, criteria. One way of categorizing signals is as between signals of a first kind, which may be typified by, but not limited to, digitized analog speech signals, and signals of a second kind, which may be typified by, but not limited to, digital computer signals. Here, signals of the first kind are assumed to have some periodic or quasi-periodic characteristic while signals of the second kind are assumed to have some nonperiodic or aperiodic characteristic.

For brevity of discussion and not by way of limitation upon the instant invention, the first kind of signals are hereinafter usually referred to by words such as "voice signals" or "speech signals" or "periodic signals". Accordingly, such signals are transmitted from, or received at, a "periodic source". As an example, it is common to generate such signals by sampling speech signals at a 8,000 hertz rate and converting each analog sample to an eight bit digitized voice sample.

On the other hand, the second kind of signals are hereinafter usually referred to by such words as "data signals" or "aperiodic signals". Accordingly, such signals are transmitted from, or received at, an "aperiodic source".

It should also be borne in mind that a source can be both a periodic source and an aperiodic source and that the adjective applied to a source is only an indication of the function of the source at that instant in time.

DIGITAL VOICE VERSUS DIGITAL DATA

In a communications system, transmission needs, in terms of capacity and in terms of delay, are usually different for digital voice signals (e.g., digitized analog speech) than for digital data signals, (e.g., digital computer-to-computer).

For example, digital voice traffic such as may be related to digitized telephone calls commonly involves transmitting a large number of bits. Using a thirty-two kilobit per second speech coder and transmitting only during active speech intervals, over four and a half megabits of digital voice traffic would be transmitted during a typical three minute telephone call. Also, digital voice traffic commonly involves relatively stringent delay requirements. For example, whereas the maximum delay allowed during a typical telephone call is in the order of a few hundred milliseconds, in a local network, the maximum delay could be expected to be significantly less than a few hundred milliseconds. Accordingly and because the participants (such as the calling and called parties) usually interact, it may be unacceptable for digital voice traffic to be accumulated over the entire time interval of the call and then to be transmitted as a large digital file transfer. Further, in a voice packet system, overhead bits can be transmitted in addition to the information bits, the latter representing the digitized voice samples. Hence, the more voice samples included in a packet, the higher the ratio of information bits to total bits and the higher the transmission efficiency of the channel. However, the more voice samples included in a packet, the greater the delay between the time a sample is generated and the time it is delivered to, for example, the receiving telephone. Accordingly, as a compromise in the balancing of the aforecited interests, voice packets including several tens of milliseconds of speech are assumed in the instant illustrative embodiment.

Also, for example, digital data traffic commonly involves a statistical distribution which is typically bimodal and which comprises short interactive messages as well as large file transfers. Commonly, traffic from digital data sources arrives sporadically, or aperiodically, at the channel. Thus, if a message is divided into data packets, a statistical variance in packet delay can usually be tolerated, providing the entire message delay is not excessive.

As to a discontinuity problem, the variance of the delay in a voice packet system could also be constrained to solve the following problem. A digital-to-analog converter, typically at a receiver, converts the digitized voice samples at a fixed rate for reconstructing the analog speech waveforms. If a packet of samples is delayed to the extent that previously transmitted samples are completely converted before the delayed packet arrives, the receiving listener would usually perceive a discontinuity in the speech. To solve that problem, if the maximum packet delay is constrained, the probability of the aforedescribed problem occurring can be reduced. Accordingly, the packet delay can be constrained by a technique in which the first packet of voice samples, which arrives at the receiver, is delayed and thereafter later packets are buffered until the later packets are needed. The delay of the first packet adds to the overall delay between the speaker and the listener and would normally be kept small. Alternatively, if the maximum delay is not constrained, the described technique could reduce, but not necessarily eliminate, the discontinuity problem.

As to a distortion problem, on the one hand, packets of voice samples that do not arrive in time at the destination, e.g., the delay requirements are not met, can normally be discarded. It can be argued that, if a small percentage of voice packets are discarded, the resultant distortion is tolerable. On the other hand, experimentation indicates that voice packets are generated in a generally periodical manner. Hence, if packets from voice sources were to collide, they would likely continue to collide on successive transmissions. Therefore, successive delays from the same voice source would tend to be correlated. Voice sources that do not contend with other voice sources for access to the channel may have a small average delay and a small variance of delay, while those that do contend with other voice sources may have a large average delay and a large variance of delay. If systems and networks are designed based upon an acceptable average level of "lost" (e.g., discarded) packets and the lost packets are concentrated among a small number of connections during a small period of time, rather than being distributed randomly, the resultant distortion may not be tolerable.

According to an aspect of the instant invention, instead of reducing the periodicities to achieve a reasonable level of lost packets, voice sample periodicities can be used to eliminate lost packets entirely. This is accomplished by the about to be described, variation on a carrier sense multiple access/collision detection (CSMA/CD) transmission protocol or method.

The instant method contemplates transmitting data packets by conventional CSMA/CD techniques such as are disclosed in the aforesaid U.S. Pat. No. 4,063,220, but also contemplates transmitting voice packets by a new and different technique. Generally, according to the method, periodic sources do not detect collisions. In addition, periodic voice packets are formatted, as is later described, to mitigate the deleterious effects of a collision. Further, periodic voice packets are given a higher retransmission priority than are aperiodic data packets. Finally, the length of aperiodic data packets is constrained.

Advantageously, the instant method limits the delay of voice packets to the time for transmitting one data packet, which time, as will shortly be made more clear, does not exceed the time for transmitting one voice packet. Also advantageously, the instant method avoids collisions with a voice packet.

As a result of employing the principles of the instant invention, periodic sources using the instant protocol appear to operate on a channel as if a time slot of a time division multiplexed (TDM) signal had been assigned to each respective voice source. A difference between the instant channel and a standard TDM channel is that a station on the instant channel is not locked solidly into a time slot. Indeed, the time slot may be shifted slightly backward in time. While the backward shift occurs, as will hereinafter be described, voice samples that arrive during the shift are transmitted in an expanded packet data field, called an overflow field.

Another interesting advantage of the instant protocol is that a periodic source can gain access to a system even though the protocol appears to be unable to handle the additional capacity. The system does not fail, but tends to operate as a fully utilized TDM system, albeit with a slightly longer time slot.

Still another advantage of the instant protocol is that, with the time slot mobility, timing discrepancies can exist between periodic sources without time slots being overwritten, which further obviates collisions with a voice packet.

PACKET FORMATS

Figure 2:
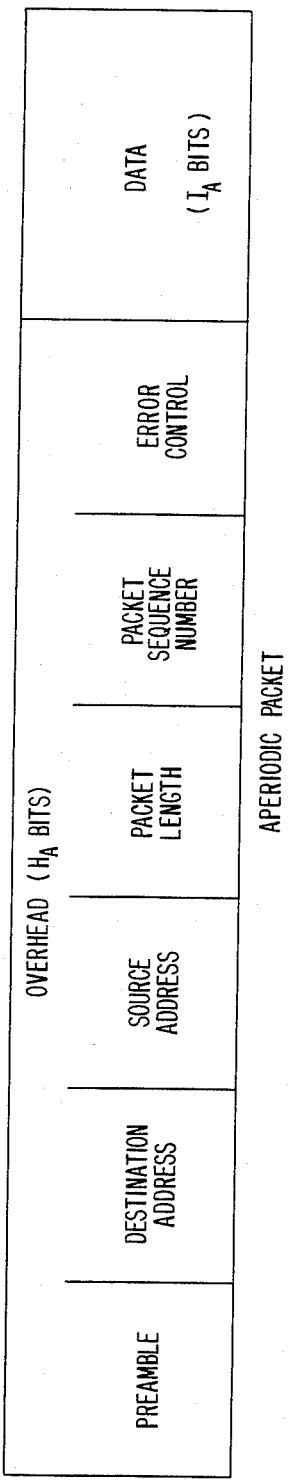
FIG. 2 illustrates a typical aperiodic data traffic packet format useful in describing the principles of the invention.

In preparation of describing more specifically the instant control protocol, FIG. 2 depicts the format of a well known, yet illustrative, aperiodic packet for communicating data traffic. For illustration, the data packet is assumed to include a plurality of fields, each field including one or more bits. Here, a data traffic packet may comprise two fields. For example, the packet may comprise an overhead field of $H_A$ bits and a data field of $I_A$ bits. As is common in the art, the overhead field may, in turn, include a preamble field for timing and synchronizing, a destination station address field for identifying a called station, a source station address field for identifying a calling station, a packet length field for identifying the number of information bits, a packet sequence number field for identifying where the packet fits in a message having a plurality of packets, an error control field for checking errors in the packet, and perhaps other field(s) for identifying other attribute(s). The data field is for inserting the "aperiodic information" to be transmitted, here shown as including a variable number $I_A$ of bits.

Figure 3:
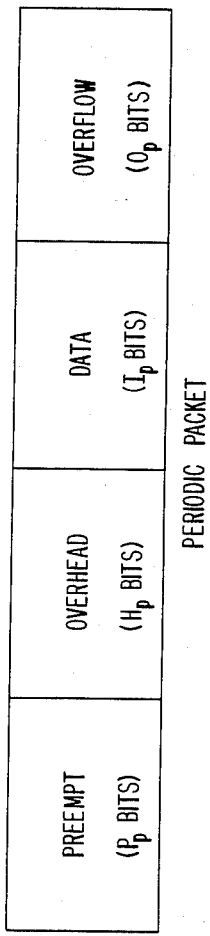
FIG. 3 illustrates a periodic voice traffic packet format useful in describing the principles of the invention.

FIG. 3 depicts a format of an illustrative periodic packet for communicating voice traffic. In accord with the principles of the instant invention, and yet for purposes of illustration, the voice packet is also assumed to include a plurality of fields, each field also including one or more bits. Here, a voice traffic packet may comprise four fields. For example, the periodic packet may comprise a preempt field of $P_p$ bits, an overhead field of $H_p$ bits, a data field of $I_p$ bits, and an overflow field of $O_p$ bits.

During the time interval of a preempt field, a periodic source would place a signal on the transmission media but would not send "useful information". The preempt interval would be, timewise, long enough for a transmitting aperiodic station source to detect a collision, stop transmitting its packet, and have the effects of the transmission removed from the system before the periodic source begins transmitting "useful information". The estimated time length of the preempt interval, $\tau_p$, is approximately:

$$\tau_p = 2\tau_t + \tau_{on} + \tau_I + \tau_{off}$$

where $\tau_t$ is the one way propagation delay in the medium, $\tau_{on}$ is the time required for the signal level to become detectable, $\tau_I$ is the time for an interfering signal to be detected, and $\tau_{off}$ is time for a signal that is turned off to stop effecting a receiver. By way of example, the bit length of the preempt field in a three megabit per second, one kilometer channel system could be ($P_p$=)38 bits long.

The length of an overhead field for a periodic packet will typically be less than the length of an overhead field for an aperiodic packet. For example, the overhead field of an aperiodic packet may be ($H_A$=)100 bits while the overhead field of a periodic packet may be ($H_p$=)48 bits. Reasons for the smaller periodic packet overhead field include the following:

(1) Since retransmitted packets can usually be expected to arrive too late to be useful, an error control field is not necessary for periodic sources. Also, it is known that a greater error rate can be tolerated in sampled voice traffic than can be tolerated with data traffic, (2) Since periodic packets do not arrive out of sequence, a sequence number field is not necessary, and (3) Since periodic packets are assumed to be fixed or deterministic in length, a packet length field is not necessary.

As to the data field, when a periodic source acquires access to the channel, it transmits in the data field all the data that has accumulated since a last transmission. The source schedules its next packet transmission to occur a predetermined time $T_p$ seconds after the successful transmission of the current packet. If the channel is not busy (i.e., is idle) at the end of the $T_p$ seconds, voice samples accumulated between transmissions will be inserted into the data field and then transmitted as a periodic packet. If the channel is busy at the end of the $T_p$ seconds, the station waits for an idle channel (WIC) before transmitting the periodic packet. Samples that arrive during the (busy) waiting time can be inserted in the overflow field of the periodic packet and transmitted when the channel becomes idle. The size of the overflow field is determinable as a function of the maximum delay a periodic source can experience. According to the instant method or protocol, the maximum delay for a periodic source fortuitously will not exceed the time for one aperiodic packet transmission. In one system, where a periodic source may generate 8000 samples per second and where each sample may comprise four bits and where $T_p$ is 30 milliseconds, a maximum of four samples could arrive during a packet transmission interval. Therefore, in that system, the overflow field comprises ($O_p$=)16 bits. On the other hand, even when that are no overflow samples to be transmitted, the source can transmit a "don't care" condition, e.g., signal carrier, during the overflow time. Advantageously a periodic source takes no more time to transmit a packet when it is delayed, e.g., because the channel is busy, than it takes when it acquires access to the channel immediately.

As priorly mentioned, it may be noted that the first packet from a periodic source may be shorter than subsequent packets since the first packet need not include either a preempt field or an overhead field. However, it may also be noted that the same packet size could be maintained for the first packet as for all other periodic packets. This makes consistent the result that the scheduled time interval between the next packet from one source and a packet from another periodic source is at least one periodic packet transmission time, $X_p$ seconds.

THE TRANSMISSION PROTOCOL

Now and referring to FIG. 4, the instant method or protocol is even more specifically described. At the same time, it should be clear that the instant protocol may be embodied in hardware or in software at each of stations 30-1 through 30-N of FIG. 1 using well-known techniques when taken in conjunction with the instant description.

With the instant protocol, if a periodic source and an aperiodic source are waiting to use a busy channel, the periodic source is assumed to have a higher access priority and hence acquires the channel first. Also, on the one hand, all of the packets from an aperiodic source and, perhaps, the first packet from a periodic source can use aspects of a conventional carrier sense multiple access/collision detection (CSMA/CD) protocol. On the other hand, a packet from a periodic source can use aspects of the instant protocol.

More particularly, before starting to transmit, the source, whether periodic or aperiodic, listens to the channel (LBT), refrains from transmitting if the channel is busy (B) and waits for an idle channel (WIC). If the channel is not busy ($\overline{B}$), the source, whether periodic or aperiodic, begins to transmit.

While transmitting, a periodic source does not listen to the channel (TLWT=NO), rather it transmits (XMIT), in a fixed length packet, all of the voice samples that it has accumulated since its last transmission. The periodic source then schedules its next transmission to occur at a fixed time $T_p$ seconds after its last successful transmission. For brevity only, in the instant illustrative embodiment, it is assumed that $T_p$ is the same for all sources.

Alternatively, an aperiodic source listens to the channel (TLWT=YES) and, if a collision (C) with another source is detected, the source stops transmitting and thereafter waits for an idle channel (WIC); else, if no collision ($\overline{C}$) is detected, the source continues to transmit. Accordingly, if the channel is busy (B) for either periodic or aperiodic source or if a collision (C) occurs for an aperiodic source, the respective source waits for an idle channel (WIC) and reschedules a transmission, i.e., tries again after the channel becomes idle (SRB or SRC).

From the foregoing and in accord with an aspect of the instant invention, a periodic source listens before transmitting (LBT) and defers transmission priority to any terminal that is then transmitting. Then, when an idle channel is detected, the periodic source begins transmitting. However, the periodic source does not listen (TLWT=NO) while transmitting but rather continues to transmit (XMIT) the entire periodic packet and does not terminate transmission prematurely. Notwithstanding, the instant protocol prevents packets from periodic sources from colliding. This fortuitous result obtains, in part, because there is a constraint on the packet size from aperiodic sources. Also, respecting a collision between periodic and aperiodic sources, the FIG. 3 packet structure for a periodic source is designed to allow an aperiodic source to detect a collision and terminate the aperiodic transmission during the preempt interval and before the periodic source begins transmitting "useful information", the useful information including, for example, the overhead field, the data field, and the overflow field of the voice packet.

As to still another advantage, as greater amounts of periodic traffic enter the system and because of a fixed length periodic packet, the system tends to resemble a time division multiplexed system. For example, a periodic source may acquire the channel and periodically use a "time slot" until either aperiodic traffic prevents access to the slot or another periodic source starts to transmit. In either event, and at that point in time, the periodic slot, which had been scheduled for the next periodic source, is shifted slightly backward in time. Additional data can be transmitted in the first delayed slot to compensate for the time shift.

Thus in summary, as to the rules for accessing the channel, it may be said that with the instant method:

(A) ACCESSING RULES FOR APERIODIC DATA TRAFFIC

The data traffic access rules are similar to those used in conventional random access broadcast networks such as that disclosed in the aforecited U.S. Pat. No. 4,063,220. The aperiodic access rules include:
  (i) Listen before transmitting (LBT)
    Before starting to transmit, listen to the channel. If the channel is busy, someone else is transmitting, accordingly, do not transmit. If the channel is not busy, also called "idle" herein, then transmit.
  (ii) Listen while transmitting (LWT)
    While transmitting (TLWT=YES), listen to signals on the channel. If the data become distorted, indicating that someone else is also transmitting, i.e., a collision, stop transmitting; otherwise, continue to transmit.
  (iii) Retry strategy
    If the channel is busy or if a collision occurs, wait for the channel to become idle, then schedule the next transmission attempt according to any of the standard (e.g., random) retry rules.

(B) ACCESSING RULES FOR PERIODIC VOICE TRAFFIC

The voice access rules take into account the periodicity of the voice traffic. The rules are different from any known method. The rules establish an upper limit on the delay experienced by voice packets. The improved periodic access rules include:
  (i) Listen before transmitting (LBT)
    Before starting to transmit, listen to the channel. If the channel is busy, someone else is transmitting, accordingly, do not transmit. If the channel is not busy, then transmit.
  (ii) Do Not Listen while transmitting
    While transmitting (TLWT=NO), do not listen to signals on the channel. Rather, continue to transmit the entire periodic packet before releasing access to the channel. A preempt field will be used to alert and, responsive to which, permit any aperiodic data source which may collide with the intended periodic packet transmission to be turned off. Advantageously, voice packets will not collide.
  (iii) Retry Strategy
    If the channel is busy, schedule the next transmission attempt as an immediate retry.
  (iv) Transmission
    Transmit, in the data field of the periodic packet, all voice samples which arrive within $T_p$ seconds of a last transmission. Before releasing access to the channel, transmit, in the overflow field of the packet, all samples which arrive during the time a periodic packet is delayed.
  (v) Scheduling Next Packet
    Schedule transmission of the next packet a predetermined time $T_p$ seconds after the last successful periodic packet transmission.

(C) ALTERNATIVE ACCESSING RULES FOR A FIRST VOICE PACKET

The first packet in a voice transmission can have the same length as a normal voice packet, but follows the access rules of a data packet.

DELAY CONSIDERATIONS

Delay can be encountered in a network when a channel is busy such that concurrently transmitted packets could or do collide. For example, a periodic source can be delayed when:
  (1) The channel is busy transmitting an aperiodic packet;
  (2) A collision with an aperiodic source occurs;
  (3) The channel is busy transmitting a periodic packet; or
  (4) A collision with a periodic source occurs.

In accord with the principles of the instant invention, only the first and third of these four conditions delay a periodic source. This obtains because, referring to FIG. 4, botn an aperiodic source and a periodic source listen to the channel before transmitting (LBT) and, responsive to a busy channel, the source waits for an idle channel (WIC). Further, the maximum delay experienced by a periodic source does not exceed $X_p$ where $X_p$ equals the time to transmit a periodic packet. Here, it is assumed that each and every periodic source has the same minimum intertransmission delay time $T_p$. The effect of timing inaccuracies is described hereinafter.

As to the second of the four delay conditions, firstly, when a periodic source and an aperiodic source collide, the aperiodic source detects the collision during the preempt interval of a packet from the periodic source and stops transmitting before the periodic source begins transmitting useful information. Therefore, a periodic source is not delayed by a collision with an aperiodic source.

Also as to the second delay condition, secondly, when a periodic source and an aperiodic source are waiting for an idle channel, the periodic source wins the race and gains access to the channel. This result obtains because the periodic source begins transmitting upon detecting the channel as idle. If the aperiodic source waits, it detects a busy channel and does not transmit. If an aperiodic source does not wait but rather begins transmitting, it detects a collision during the preempt interval of the periodic source packet and stops transmitting. Therefore, a periodic source can only be delayed by either a periodic source or an aperiodic source whose transmission is already in progress. This delay is at most one periodic packet transmission time.

As to the fourth delay condition, consider a plurality of k periodic packet sources. Now consider a first sequence of intended transmissions from the respective periodic sources on a channel, the sequence being defined so that a packet from source 30-i is scheduled for transmission before a packet from source 30-(i+1). Let (a) $t_{i,j}$ represent the time that a transmission from source 30-i is scheduled to be received at destination 30-j. Hence, times $t_{1,1}, t_{2,2}, \ldots, T_{k,k}$ are also approximately the times the respective k sources are scheduled to transmit a packet (i.e., intrastation transmission time is assumed to be negligible), (b) $t'_{i,j}$ represent the time that a transmission from source 30-i actually is received at source 30-j, and (c) $D_{i,j} = t'_{i,j} - t_{i,j}$ represent the delay a packet encounters in being transmitted from source 30-i to destination (source) 30-j.

Now assume that the transmission from each periodic source lasts a time $X_p$ seconds. That is, the packet transmission time required by a periodic source 30-i to transmit a fixed-length packet is $X_p$ even though the packet is delayed and even though the packet may include waiting time voice samples in its overflow field. Therefore, as between one periodic source 30-i and another periodic source such as source 30-(i+1), $$t_{i+1,i+1} - t_{i,i+1} \geq X_p \quad (1)$$

which may also be written as $$t_{i+1,i+1} \geq t_{i,i+1} + X_p \quad (2)$$

Since media propagation time is usually independent of the delay, the delay is the same for each source. Hence, the notation $D_{i,j} = D_i$ is used hereinafter.

Now, if $D_i$ equals zero, periodic source 30-i does not delay another periodic source such as source 30-(i+1). Further, as long as $D_i$ does not exceed $X_p$, the two periodic sources, i.e., sources 30-i and 30-(i+1), will not collide.

Also, it may be noted that a periodic source cannot be delayed by another periodic source which has not itself been delayed. Therefore, if a periodic source is delayed by another periodic source, the other periodic source must have been priorly delayed. Accordingly, the delay incurred by the first periodic source to be delayed does not exceed $X_p$.

In light of the above, a packet from periodic source 30-(i+1) is not delayed by periodic source 30-i. On the other hand, the (i+1)th periodic source may be delayed by an aperiodic source, responsive to which, a second sequence of intended but delayed transmissions from the respective periodic sources may be considered. Notwithstanding, the delay which source 30-(i+1) incurs will not exceed $X_p$ and the periodic sources will not collide. This delay may propagate and effect a sequence of periodic sources. For example, in a general sequence of periodic sources, if $$D_i < X_p,$$

then, $$t'_{i,i+1} < t_{i+1,i+1},$$

and, the $i^{th}$ and $(i+1)^{th}$ sources do not collide. Further, the transmission time required by the $i^{th}$ periodic source is $X_p$, even though it is delayed, and must transmit more samples. If, $$t_{i,i+1} + X_p \leq t_{i+1,i+1},$$

then, the $(i+1)^{th}$ source is not delayed by the $i^{th}$ periodic source. This source may be delayed by an aperiodic source, and start a new sequence of delayed sources, but the delay it incurs will be less than $X_p$. If, $$t_{i,i+1} + X_p > t_{i+1,i+1},$$

the delay encountered by a packet being transmitted from the (i+1)th source is $$D_{i+1} = t'_{i,i+1} - t_{i+1,i+1} + X_p. \quad (3)$$

Since the (i+1)th periodic source is waiting for the channel, the delay cannot be increased by an aperiodic source. This is so because a periodic source has priority over an aperiodic source, which priority is embodied through the preempt field. The delay $D_{i+1}$ can be written as $$D_{i+1} = D_i + t_{i,i+1} - t_{i+1,i+1} + X_p. \quad (4)$$

Since, by rewriting equation (1) to a form $$t_{i,i+1} - t_{i+1,i+1} + X_p \leq 0 \quad (5)$$

it is clear that $D_{i+1}$ does not exceed $D_i$. Therefore, the delay incurred by a sequence of periodic sources is a non-increasing function, and the maximum delay incurred by a periodic source does not exceed $X_p$, and periodic sources do not collide.

Thus in summary, as to voice packet collisions, it may be said, with the instant protocol, that:

(A) As to a voice packet collision with a data packet (i) If a data packet accesses an idle channel, and its signal arrives at a voice station before the voice station starts transmitting, the voice station may be delayed from transmitting for at most one aperiodic data packet transmission time.

(ii) Assume a data station and a voice station begin transmitting at approximately the same time. A collision would occur in a conventional system. With the instant method, the data source detects the voice packet and removes the data packet from the channel before the pre-empt interval of the voice packet is complete. Therefore, the useful voice information is not distorted, and the voice packet is not delayed.

(iii) Assume both a data packet and a voice packet are waiting for a busy channel to become idle. After the channel becomes idle the voice source immediately begins transmitting while the data source starts transmitting some (perhaps random) time later. Even if the data packet begins transmission before it detects the voice packet, it will be turned off during the pre-empt interval.

(iv) The result of the foregoing is that a voice packet can be delayed by at most one aperiodic packet time interval.

(B) As to a voice packet collision with a voice packet (i) The next transmission from a voice source is scheduled $T_p$ seconds after the channel is successfully accessed. Since two stations cannot successfully access the channel at the same time, their next transmissions will not interfere unless one of them is delayed.

(ii) If the preceding voice source is delayed by a data source, the delay will not exceed one aperiodic packet transmission time. Voice samples accumulated during the delay will be transmitted in an overflow field, which is transmitted, i.e., whether or not there is a delay. Therefore, the voice source will not be delayed by more than one aperiodic packet transmission time, and will not delay future voice sources by more than one aperiodic packet transmission time.

(iii) The minimum spacing between voice packets is a voice packet transmission time $X_p$. The maximum delay caused by a data packet collision is one data packet transmission time. The data packet transmission time does not exceed a voice packet transmission time. Therefore, there will never be two voice packets waiting to acquire a busy channel, and two voice packets will not collide.

(iv) The maximum voice packet delay is one data packet transmission time. This determines the overflow field size, i.e., the number of bits needed to transmit voice samples which arrive during a data packet transmission time.

OVERFLOW TRAFFIC

Consider a system operating in a mode in which the channel capacity is almost completely used by periodic sources. Assume that a time gap remains between scheduled transmissions which gap is large enough for another source to begin transmitting but which gap is not large enough to transmit an entire periodic packet. Assume that another periodic source has access to the channel at this time. In such a situation, the system begins to operate without time gaps. The period of time between channel acquisitions increases, and some or all of the bits in the overflow field in every periodic packet are used. However, whenever a periodic source can acquire the channel, it can transmit its packet. For example, let a periodic source begin transmitting in a small time gap. The periodic source, which is delayed, is delayed for a time that does not exceed $X_p$. The source will transmit in its overflow field all voice samples accumulated during the delay. The source also schedules its next transmission to begin $T_p$ seconds after it successfully completed its last transmission. Successive periodic sources are delayed by a time interval which is less than or equal to the time delay incurred by the preceding source. The original interfering source becomes another source in the sequence of interfering sources. It can be delayed by no more than the delay it originally caused and can delay the source following it by no more than it did originally. Since the delay is a non-increasing function and since it cannot go to zero for the over-utilized channel, it must stabilize at some positive time, $\epsilon$, which is the same for all sources. The delay, $\epsilon$, is equal to $X_p$ minus the sum of the idle channel times for a period $T_p$ before the overflow source entered the channel.

When the stable situation occurs, each periodic source transmits a packet every $T_p + \epsilon$ seconds. It transmits the samples which have arrived in this interval of time in the data and overflow fields of the transmitted packet. At the end of each transmission there would be a periodic source which has been waiting $\epsilon$ seconds. The waiting source acquires the channel before an aperiodic source as well as before the first packet from another periodic source. Until one of the sources terminates its transmission, at which point in time channel capacity becomes available, the system operates as a time division multiplexed system with a "time slot" period of $T_p + \epsilon$ seconds. No data is lost, and the slot delays do not grow indefinitely.

TIMING CONSIDERATIONS

In a sampled communications system, it is common for the transmitter and receiver to be frequency synchronized so that samples are transmitted at the same rate at which they are generated. In broadcast networks, the synchronization can be achieved by sending a clock signal outside of the normal signal band or alternatively by using a modulation rule with a clock component. The former technique provides accurate timing, but requires that one station be responsible for sending the clock signal on the system. In the latter technique, there is no centralized control and every transmitting station is identical, but timing discrepancies may exist between the transmitters, particularly when very little data is being transmitted.

Timing discrepancies result in the periodic stations having different estimates of the interpacket interval $T_{i,p}$. For example, assume that the interpacket interval $T_{i,p}$ for periodic source 30-i is within $\epsilon$ seconds of $T_p$, so that: $T_{i,p} - T_p \leq \epsilon$. Let periodic sources 30-i and 30-(i+1) transmit at times $t_{i,i+1} = t$ and $t_{i+1,i+1} = t + X_p$, respectively, so that there is no separation of the packets at source 30-(i+1). The next packets from these sources are scheduled at times $t_{i,i+1} = t + T_{i,p}$ and $t_{i+1,i+1} = t + X_p + T_{i+1,p}$ respectively. These two latter times may be separated by as little as $X_p - 2\epsilon$. If the first packet in this sequence is delayed by a packet from an aperiodic source, it may be delayed until $t_{i,i+1}' < t + T_{i,p} + X_a$. With the constraint $X_a \leq X_p$, it is possible that both periodic sources will be waiting for the channel and collide. Such a collision can be prevented by constraining the length of an aperiodic packet to: $X_a \leq X_p - 2\epsilon$. With this constraint, the sequences of periodic sources do not collide, and the delay of an aperiodic source $X_a$ is less than $X_p$.

Although the invention has been described and illustrated in detail, it is to be understood that the same is not by way of limitation. For example, the principle of the invention apply equally to alternatives. Hence the spirit and scope of the invention is limited only by the terms of the appended claims.

What is claimed is:

1. A method for controlling digital signals in a communications system, said system including a communications channel, a plurality of station sources, at least two of said sources being adapted to be coupled to said channel, said method including the steps of
receiving signals from said channel, responsive to said received signals, detecting the busy/idle status of said channel,
responsive to said channel being detected as busy waiting for an idle channel and
at least one of said station sources is a station source of a first kind and at least one other of said station sources is a station source of a second kind, and
said method further comprises the steps of:
responsive to said channel being detected as idle, acquiring access to said channel;
responsive to acquiring said channel, transmitting a packet from a first source to a second source on said channel;
responsive to said packet being from a first source of said first kind, said transmitting step further including the steps of
including a preempt field in said packet, said preempt field comprising a delay signal, said delay signal lasting a predetermined time interval, and
continuing to transmit said packet without listening to said channel; and
responsive to said packet being from a first source of said second kind, said transmitting step further including the step of
listening to said channel while continuing to transmit said packet, said listening step further comprising the steps of
upon detecting a collision while listening to said channel, terminating any transmitting from said first source of said second kind within a time interval that is no more than the predetermined time interval of said preempt field delay signal, and
responsive to said terminating, waiting for said channel to become idle before retransmitting said packet.

2. The method defined in claim 1 further comprising the steps of:
upon acquiring access to said channel, transmitting all signals of said first kind which have accumulated since said transmitting source last acquired said channel, and
after transmitting all of said signals of said first kind, terminating said transmission by releasing access to said channel.

3. The method defined in claim 1 further comprising the step of:
at said source of said first kind, scheduling a next transmission from said source of said first kind to another source, said next transmission to begin a predetermined time $T_p$ after terminating said continued transmission.

4. The method defined in claim 2 further comprising the step of:
at said source of said first kind, scheduling a next transmission from said source of said first kind to another source, said next transmission to begin a predetermined time $T_p$ after terminating said continued transmission.

5. A communications system including a communications channel, a plurality of station sources, at least two of said sources being adapted to be coupled to said channel,
means for controlling digital signals through said system, said controlling means including
means for receiving signals from said channel,
means responsive to said received signals for detecting the busy/idle status of said channel,
means responsive to said channel being detected as busy for waiting for an idle channel and characterized in that
at least one of said station sources is a station source of a first kind and at least one of said station sources is a station source of a second kind, and
said system further comprises:
means responsive to said channel being detected as idle for acquiring access to said channel;
means responsive to acquiring said channel for transmitting a packet from a first source to a second source on said channel;
said transmitting means further including
means responsive to said packet being from a first source of said first kind for including a preempt field in said packet, said preempt field comprising a delay signal, said delay signal lasting a predetermined time interval,
means responsive to said packet being from a first source of said first kind for continuing to transmit said packet without listening to said channel, and
means responsive to said packet being from a first source of said second kind for listening to said chanel while continuing to transmit said packet, said listening means comprising
means responsive to detecting a collision while listening to said channel for terminating any transmission from said first source of said second kind within a time interval that is no more than the predetermined time interval of said preempt field delay signal, and
means responsive to said termination for waiting until said channel becomes idle before retransmitting said packet.

6. The system defined in claim 2 further comprising
means responsive to acquiring access to said channel for transmitting all signals of said first kind which have accumulated since said transmitting source last acquired said channel, and
means responsive to transmitting all of said signals of said first kind for terminating said transmission by releasing access to said channel.

7. The system defined in claim 2 further comprising
at said source of said first kind, means for scheduling a next transmission from said source of said first kind to another source, said next transmission to begin a predetermined time $T_p$ after terminating said continued transmission.

8. The system defined in claim 6 further comprising
at said source of said first kind, means for scheduling a next transmission from said source of said first kind to another source, said next transmission to begin a predetermined time $T_p$ after terminating said continued transmission.

* * * * *

UNITED STATES PATENT AND TRADEMARK OFFICE
CERTIFICATE OF CORRECTION

PATENT NO. : 4,516,239

DATED : May 7, 1985

INVENTOR(S) : Nicholas F. Maxemchuk

It is certified that error appears in the above-identified patent and that said Letters Patent is hereby corrected as shown below:

Column 1, line 63, "inown" should read --known--. Column 8, line 6, "that" should read --there--. Column 10, line 50, "botn" should read --both--. Column 11, line 25, "$t_{i,j}$" should read --$t'_{i,j}$--; line 27, "$t'_{i,j} - t_{i,j}$" should read --$t'_{i,j} - t_{i,j}$--. Column 12, line 8, "$t'_{i,i+1}$" should read --$t'_{i,i+1}$--; line 26, "$D_{i+1}t'_{i,i+1}$" should read --$D_{i+1} = t'_{i,i+1}$--. Column 14, line 48, "$t'_{i,i+1}$" should read --$t'_{i,i+1}$--. Column 15, line 4, after "and" should read --CHARACTERIZED IN THAT--. Column 16, line 31, "chanel" should read --channel--.

Signed and Sealed this

Tenth Day of December 1985

[SEAL]

Attest:

DONALD J. QUIGG

Attesting Officer

Commissioner of Patents and Trademarks